United States Patent Office.

JOHN OSBORNE CHRISTIAN, OF MANCHESTER, AND JOHN CHARLTON AND HENRY CHARLTON, OF STRANGEWAYS, ENGLAND.

*Letters Patent No. 68,955, dated September 17, 1867; antedated September 15, 1866.*

IMPROVEMENT IN THE MANUFACTURE OF MAGNESIUM.

*The Schedule referred to in these Letters Patent and making part of the same.*

TO ALL WHOM IT MAY CONCERN:

Be it known that we, JOHN OSBORNE CHRISTIAN, of Manchester, England, JOHN CHARLTON and HENRY CHARLTON, of Strangeways, England, have invented a new and useful Improvement in Treating and Producing Compounds of Magnesium; and we do hereby declare that the following is a full, clear, and exact description thereof, which will enable others skilled in the art to fully understand and make use of the same.

This invention relates, first, in producing sulphate of magnesia, or other salts of magnesia, during the process of generating carbonic acid gas, as practised, for instance, in the manufacture of soda-water and artificial mineral-waters, or during the process of distilling tar-water, and of manufacturing ammonia or its salts from any of the salts of ammonia, by substituting for carbonate of lime the carbonate of magnesia or "Dolomite," or a carbonate of magnesia or magnesite combined with any other carbonate. It consists also in treating "Dolomite" or other magnesian compounds, either in a wet or dry state, with sulphuretted hydrogen gas, so as to produce sulphate of magnesia or other valuable magnesian residue, which can be advantageously used for the manufacture of sulphate or other compounds of magnesia.

In the usual process of generating carbonic acid gas, for aerating waters or for other purposes, carbonate of lime or common marble is used, and by treating this marble with sulphuric acid the carbonic acid is driven out and residuum is left of no practical value. Instead of the carbonate of lime we employ carbonate of magnesia or other salts of magnesia, and by these means we obtain as residue sulphate or other compounds of magnesia, which can be used for various purposes.

The same result is obtained by substituting magnesia or magnesian compounds for lime in the process of distilling tar-water, and in the manufacture of ammonia or its salts from any of the salts of ammonia, leaving valuable magnesian compounds as residue.

Sulphate of magnesia or other valuable magnesian residue is also obtained by passing sulphuretted hydrogen through "Dolomite" or calcined Dolomite or other magnesian compounds, either in a wet or dry state, which will leave a residue valuable for the manufacture of sulphate or other compounds of magnesia.

What we claim as our invention, and desire to secure by Letters Patent of the United States of America, is—

1. Producing sulphate of magnesia or other salts of magnesia during the process of generating carbonic acid gas or of distilling tar-water or of manufacturing ammonia or its salts, substantially as herein set forth.

2. Treating "Dolomite" or other magnesian compounds with sulphuretted hydrogen, substantially as and for the purpose described.

JOHN OSBORNE CHRISTIAN,
JOHN CHARLTON,
HENRY CHARLTON.

Witnesses:
ALBERT E. OVERELL,
LEWIS SARGEANT.